Oct. 20, 1970     F. F. SPREITZER     3,535,031

MICROFILM DISPLAY APPARATUS

Filed March 4, 1968

INVENTOR
FRANCIS F. SPREITZER
BY
ATTORNEYS

United States Patent Office 3,535,031
Patented Oct. 20, 1970

3,535,031
MICROFILM DISPLAY APPARATUS
Francis F. Spreitzer, 4415 W. 62nd St.,
Los Angeles, Calif. 90043
Filed Mar. 4, 1968, Ser. No. 710,110
Int. Cl. G03b *21/22*
U.S. Cl. 353—44          5 Claims

ABSTRACT OF THE DISCLOSURE

Microfilm display apparatus arranged to display an enlarged film image within a shrouded enclosure open only along one side thereby to shield the display surface from major portions of the ambient lighting. The enlarged image is displayed in convenient viewing position to the user and adjacent a writing surface for use in making notes. A single control is manipulatable to advance or reverse the film feed at varying rates at the user's option and by his non-writing hand. The projector is partially exposed and conveniently positioned for changing the film and servicing. The shrouded display compartment may be supported from the floor and all mechanism is located within the confines of the flat-surfaced exterior of the apparatus.

---

This invention relates to microfilm display apparatus and more particularly to improved equipment of this type having the outward appearance of an article of furniture and incorporating features and capabilities not heretofore available.

Microfilm readers as heretofore constructed are subject to numerous disadvantages sought to be avoided by the present invention. Such prior devices are inherently unsightly and esthetically objectionable because of mechanical equipment having exposed operating components so objectionable and lacking in harmony with the surrounding furnishings.

It is therefore a primary object of the present invention to provide a microfilm projector and display apparatus designed to blend harmoniously with the decor of the most tastefully decorated interior settings including office reception rooms, public lounges, libraries and the like. Essential components of the display apparatus are confined entirely within the exterior surfaces of a shroud enclosed except across its open viewing side. This equipment is so arranged within this light excluding shroud as to permit wide range latitude to the designer of the enclosure without detracting from the efficiency and effectiveness of the display equipment proper.

Another feature of the invention is an arrangement whereby the enlarged film image is projected onto a viewing surface conveniently viewable at one side of a large are writing surface useful in copying or making notes. A single manually manipulatable control can be operated in opposite directions to control advance and reverse film travel at the user's option and at different rates of speed. The projector proper is substantially concealed within a recess fully within the exterior confines of the apparatus housing and is readily removable for servicing and inspection.

These and other more specific objects will appear upon reading the following specification and claims and upon considering in connection therewith the attached drawings to which they relate.

Referring now to the drawing in which a preferred embodiment of the invention is illustrated.

Figure 1:
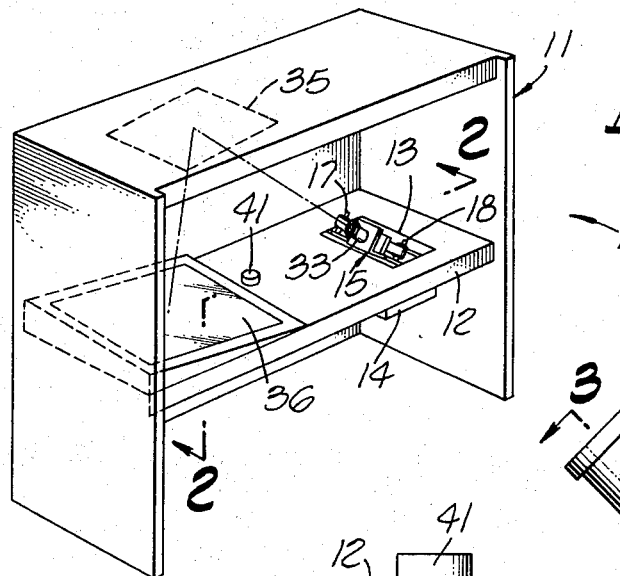
FIG. 1 is a perspective view of one preferred embodiment of the invention display apparatus as viewed from the open side thereof.
Figure 2:
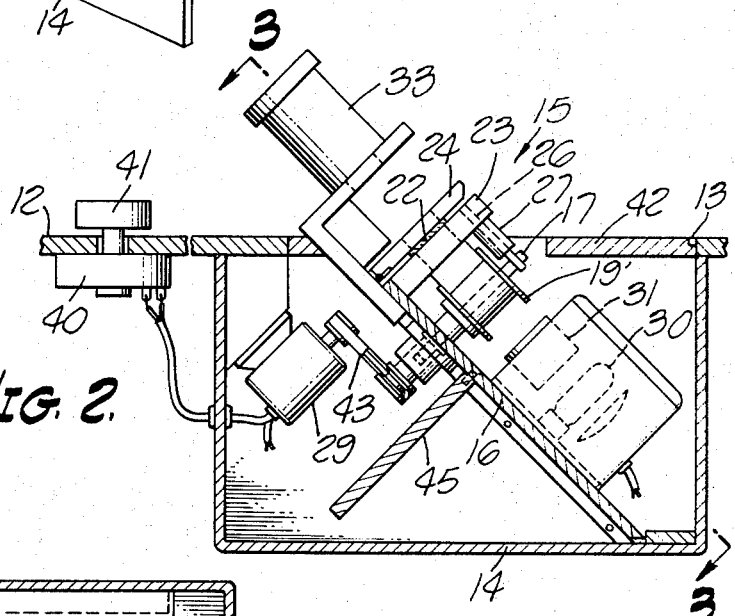
FIG. 2 is an enlarged cross-sectional view of the projector taken along line 2—2 on FIG. 1.
Figure 3:
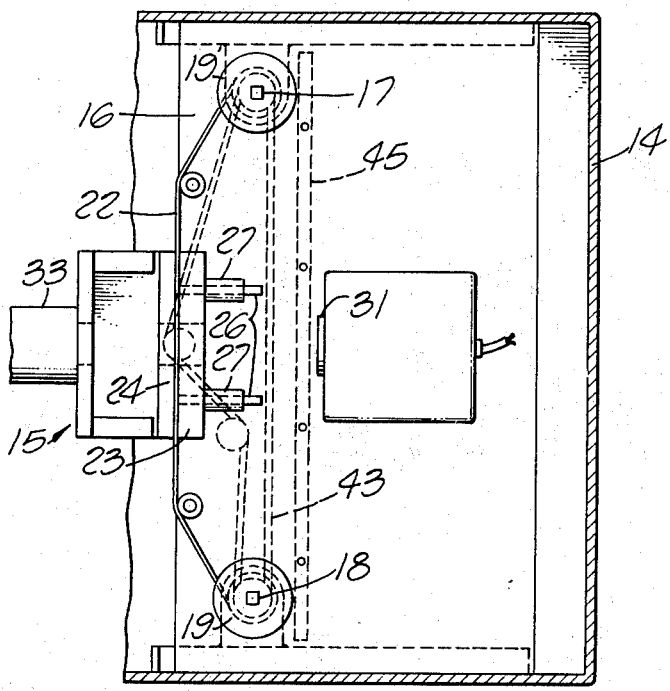
FIG. 3 is a fragmentary cross-sectional view of the projector taken along line 3—3 on FIG. 2.

Referring more particularly to FIG. 1, there is shown one illustrative embodiment of the invention display apparatus, designated generally 10, having a floor-supported main housing 11 fully closed except across its front side. Although housing 11 may have any desired configuration and decorative decor, the housing shown by way of example is made of selected wood and all exterior surfaces are flat and free of projections or depressions. A shelf 12 supported horizontally between its upright end walls has an upper surface at a convenient writing level for the user while seated in a chair in front of the open side. Adjacent one end of shelf 12 is an opening 13 extending into a projector seating well 14. As is best shown in FIGS. 1 and 2, a unitary projector designated generally 15 has a main frame 16 and rests on suitable supports with its optical axis inclined at approximately 45 degrees to the horizontal. Frame 16 supports a pair of rotatable spindles 17, 18 on the opposite sides of its optical axis arranged to seat and drive film spools 19, 19'. Usually, but not necessarily, the spool supported on cap stand 18 is the film storage spool and that supported on spindle 17 is the take-up spool.

Film 22 extends crosswise of the optical axis and is normally held pressed against an apertured plate 23 by a glass slab 24. The latter acts by gravity to hold the film normally lightly pressed flat against plate 23 except when held tilted to the left, as viewed in FIG. 2, by the armature 26 of a solenoid 27. The latter is arranged to be energized to tilt plate 24 to the left whenever drive motor 29 for the film spools is energized. At all other times the solenoids are de-energized and the plate rests flush against the film.

Projector 15 includes a lamp 30 cooperating with a condenser lens system 31 to project a concentrated light beam through the film and then through an adjustable focusing lens system 33 onto a mirror or the like reflecting surface indicated at 35 and thence onto a suitable display screen 36. It will be understood that reflector 35 and screen or display surface 36 are preferably arranged at the proper angles to minimize distortion of the image.

Motor 29 is of the reversible variable speed type regulatable by a control 40 having a single control knob 41 conveniently positioned for manipulation by the user's non-writing hand while using the other hand to write on sheet material supported on shelf 12. When the control knob is in its null position no power is supplied to motor 29 and the film remains stationary. However, if the user turns knob 41 to the right the motor drives the film strip in one direction through belt 43 whereas, if knob 41 is turned in the opposite direction from its null position, the film is driven in the opposite direction. In either case the direction and magnitude of movement of the control knob from its null position determines the direction of rotation and the operating speed of the motor, a result obtained by using the control knob movement to reverse the polarity and to vary the power supply to the motor, it being understood that the motor starts slowly in either direction and that its speed increases with knob movement away from zero position.

It will be understood that projector 15 rests by gravity in well 14 and that a major portion of the projector is concealed within this well by the removable cover member 42. When this cover is removed, the projector may be bodily lifted from its normal operating position and disengaged from the resilient driving belt 43. Thereafter the projector can be supported in inclined position on any flat surface in part on its rear end and in part on strut 45. When so supported, its optical axis is supported in substantially the same position as when seated in well 14 with the result that the parts can be inspected and adjusted for proper functioning under the same conditions as when in actual use.

While not so shown in the drawing, it will be understood that driving motor 29 may be supported directly on main frame 16 and that its power leads provided with disconnectible connectors or by an ample length of service cord.

The manner of operating and using the described micro-film display apparatus will be quite evident from the foregoing detailed description of its components and their operative relationship to one another. The operator places the apparatus in use by dropping supply and take up spools 19, 19' over the respective spindles 17, 18 and threading the intervening portion of film strip 22 between plate 23 and pressure plate 24. The equipment is now ready for use and the operator seats himself comfortably in front of shelf 12 with his left hand on control knob 41, adjusting it clockwise or counterclockwise, as desired, to advance or retract the film to throw the desired frame or image onto display surface 36. His right hand is entirely free to make any written notes on paper supported on shelf 12 to the right of the display surface 36. His use of the writing space does not interfere in any way with the projection of the image onto screen 36 nor with the adjustment of control knob 41. It will be understood that a foot or knee operated control may be properly positioned beneath shelf 12 and utilized in lieu of knob 41 to control operation of the projector thereby leaving both hands free for the purposes at hand. Accordingly, it will be appreciated the projector control may take any desirable form and be positioned wherever most convenient to accommodate the preferences of individual users.

While the particular microfilm display apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Microfilm display apparatus comprising horizontally elongated compartment means closed except along the open front side thereof, a generally horizontal shelf extending from end to end and between the front and rear sides of said compartment means and shielded except along said front side from ambient light, one end portion of said shelf supporting an upwardly facing generally horizontal viewing screen and the other end half of said shelf providing a large area writing surface closely adjacent one lateral edge of said viewing screen, microfilm projector means supported inwardly of the exterior surfaces of said compartment and including mirror means positioned beneath the interior top side of said compartment means for reflecting an enlarged image of microfilm onto said viewing screen, and operating means for driving said projector means in either direction to display any selected film image on said viewing screen.

2. Microfilm display apparatus as defined in claim 1 characterized in that said compartment means is floor supported with said shelf located at table top level to accommodate a user while sitting down and facing the interior of the compartment from the open side thereof.

3. Microfilm display apparatus as defined in claim 2 characterized in that the open side thereof is open substantially throughout one vertical side thereof down to floor level and in that the other side and end walls thereof extend substantially for the full height of said compartment means.

4. Microfilm display apparatus as defined in claim 1 characterized in that said projector operating means is effective to drive said projector means in either direction at any of many different speeds, and control means for said projector operating means readily manipulatable to select the operating speed of said projector operating means and for gradually increasing and decreasing the operating speed thereof.

5. Microfilm display apparatus as defined in claim 1 characterized in that said projector means is supported in well means opening through said shelf and in an area to one lateral side of said image viewing screen.

References Cited

UNITED STATES PATENTS

| 2,332,810 | 10/1943 | Place | 353—44 X |
| 2,398,923 | 4/1946 | Dahl | 353—77 |
| 2,665,608 | 1/1954 | Clark | 353—78 X |
| 2,692,529 | 10/1954 | Halahan et al. | 353—77 X |

FOREIGN PATENTS

| 1,489,873 | 6/1967 | France. |
| 705,026 | 3/1954 | Great Britain. |

WILLIAM D. MARTIN, Jr., Primary Examiner

U.S. Cl. X.R.

353—77, 79